United States Patent
Yamano et al.

(10) Patent No.: US 9,309,858 B2
(45) Date of Patent: Apr. 12, 2016

(54) INTERNAL COMBUSTION ENGINE CONTROL DEVICE

(71) Applicant: NISSAN MOTOR CO., LTD., Yokohama-shi, Kanagawa (JP)

(72) Inventors: Kentaro Yamano, Isehara (JP); Yuji Sasaki, Hadano (JP); Takao Kawasaki, Machida (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 7 days.

(21) Appl. No.: 14/364,084

(22) PCT Filed: Jan. 23, 2013

(86) PCT No.: PCT/JP2013/051322
§ 371 (c)(1),
(2) Date: Jun. 10, 2014

(87) PCT Pub. No.: WO2013/111781
PCT Pub. Date: Aug. 1, 2013

(65) Prior Publication Data
US 2014/0360464 A1 Dec. 11, 2014

(30) Foreign Application Priority Data
Jan. 25, 2012 (JP) ................................. 2012-012543

(51) Int. Cl.
*F02P 5/145* (2006.01)
*F02D 41/08* (2006.01)
*F02P 5/15* (2006.01)

(52) U.S. Cl.
CPC .............. *F02P 5/145* (2013.01); *F02D 41/083* (2013.01); *F02P 5/1508* (2013.01); *Y02T 10/46* (2013.01)

(58) Field of Classification Search
CPC . F02D 2250/18; F02D 37/02; F02D 41/0002; F02D 2250/21; F02D 2200/1004; F02D 11/105; F02D 41/083
USPC .................... 123/350, 352, 319, 329, 406.11, 123/406.12, 406.23, 406.24; 701/101, 102, 701/103
See application file for complete search history.

(56) References Cited

U.S. PATENT DOCUMENTS 5,625,558 A * 4/1997 Togai et al. ..................... 701/93
5,765,527 A    6/1998 Lehner et al.
(Continued)

FOREIGN PATENT DOCUMENTS

DE    19517673 A1   11/1996
DE    10324958 A1   12/2004
(Continued)

OTHER PUBLICATIONS

Machine translation of JP 10-002246A, see "JP10002246A_MachineTranslation.pdf" published 1998.*

*Primary Examiner* — Lindsay Low
*Assistant Examiner* — Long T Tran
(74) *Attorney, Agent, or Firm* — Drinker Biddle & Reath LLP

(57) ABSTRACT

In an internal combustion engine control device, a predetermined margin torque is set such that it is possible to maintain a predetermined engine idling speed by adjusting ignition timing with respect to load fluctuations during idling operation. The margin torque is set to decrease, as a load, acting on the internal combustion engine during idling operation, increases. Accordingly, the margin torque can be set to an appropriate value, and thus it is possible to improve a fuel economy performance during idling operation of the internal combustion engine.

26 Claims, 6 Drawing Sheets

(56) References Cited

U.S. PATENT DOCUMENTS

| | | | | |
|---|---|---|---|---|
| 6,095,117 | A * | 8/2000 | Minowa et al. | 123/399 |
| 7,744,504 | B2 * | 6/2010 | Satou et al. | 477/175 |
| 7,975,670 | B2 * | 7/2011 | Ito | 123/339.11 |
| 8,090,519 | B2 * | 1/2012 | Soejima et al. | 701/103 |
| 2002/0132701 | A1 * | 9/2002 | Mabuchi et al. | 477/110 |
| 2006/0102143 | A1 * | 5/2006 | Yagi | 123/339.11 |
| 2006/0102146 | A1 * | 5/2006 | Cohn et al. | 123/406.29 |
| 2008/0119328 | A1 * | 5/2008 | Satou et al. | 477/181 |
| 2008/0306643 | A1 * | 12/2008 | Hanyu et al. | 701/22 |
| 2010/0175663 | A1 * | 7/2010 | Ito | 123/406.12 |
| 2012/0083991 | A1 * | 4/2012 | Miyata et al. | 701/102 |
| 2012/0083993 | A1 * | 4/2012 | Shibata et al. | 701/103 |

FOREIGN PATENT DOCUMENTS

| | | |
|---|---|---|
| EP | 1467077 A1 | 10/2004 |
| JP | H10-2246 A | 1/1998 |
| JP | H10-503259 A | 3/1998 |
| JP | H11-182284 A | 7/1999 |
| JP | 2002-036867 A | 2/2002 |
| JP | 2003-269306 A | 9/2003 |
| JP | 2009-167991 A | 7/2009 |
| JP | 2010-065571 A | 3/2010 |
| JP | 2011-017253 A | 1/2011 |
| JP | 2011-256738 A | 12/2011 |
| WO | WO-2005093238 A1 | 10/2005 |

* cited by examiner

INTERNAL COMBUSTION ENGINE CONTROL DEVICE

TECHNICAL FIELD

The present invention relates to an internal combustion engine control device configured to suppress rotation fluctuations occurring owing to load changes during idling operation.

BACKGROUND ART

An engine, which is mounted on a vehicle as a driving power source, also serves as a driving power source for auxiliary machines, such as a compressor of an air conditioner, an oil pump of a power steering, and the like. For this reason, a load of an internal combustion engine tends to fluctuate depending on operating conditions of these auxiliary machines, and thus an output torque of the internal combustion engine also tends to fluctuate. For instance, when these auxiliary machines are driven, the load of the internal combustion engine increases and hence the output torque of the internal combustion engine decreases.

As a countermeasure against such load fluctuations of the internal combustion engine, an intake air quantity may be controlled according to the load fluctuations such that the output torque of the internal combustion engine changes. In this manner, it is possible to cope with such a situation. However, when changing the output torque of the internal combustion engine by controlling the intake air quantity, a certain response delay occurs until a change in throttle opening emerges as a change in the quantity of air with which the combustion chamber is filled. Therefore, it is impossible to compensate for output torque fluctuations of the internal combustion engine, occurring owing to the load fluctuations of the internal combustion engine, with a better response by intake-air-quantity control. Also, at idling operation during which the output torque of the internal combustion engine becomes small, the influence of the load fluctuations of the internal combustion engine on the output torque of the internal combustion engine becomes relatively great.

Therefore, Patent document 1 teaches an internal combustion engine that, at idling operation during which the output torque of the internal combustion engine becomes small, ignition timing is shifted to an ignition-timing change side on which the output (the efficiency) is decreased, while supplying an intake air quantity exceeding a given quantity corresponding to an actual output torque, so as to cope with the load fluctuations of the internal combustion engine by ignition-timing adjustment. That is, a predetermined margin torque is preset as a torque that can be increased only by ignition-timing adjustment. Hence, when the load of the internal combustion engine has fluctuated during idling operation, it is possible to change the output torque of the internal combustion engine with a better response only by ignition-timing adjustment.

However, in the above-mentioned Patent document 1, the margin torque is set to increase, when the load of the internal combustion engine is high during idling operation.

The load acting on the internal combustion engine during idling operation tends to increase, when the auxiliary machines and the like come into operation. Thus, when the load during idling operation is high, it is considered that many auxiliary machines are in their active states. Conversely when the load during idling operation is low, it is considered that many auxiliary machines are in their inactive states. That is, in the case that the load of the internal combustion engine during idling operation is high, it is considered that the total auxiliary load of auxiliary machines which may possibly act on the internal combustion engine tends to decrease from such a high-load condition. Conversely in the case that the load of the internal combustion engine during idling operation is low, it is considered that the total auxiliary load of auxiliary machines which may possibly act on the internal combustion engine tends to increase from such a low-load condition.

For the reasons discussed above, there is a problem that such margin-torque setting as disclosed in the above-mentioned Patent document 1, in which the margin torque is set to increase when the load during idling operation is high, does not accord with the actual situation.

CITATION LIST

Patent Literature

Patent document 1: Japanese Unexamined Patent Application Publication (Translation of PCT Application) No. 1998-503259

SUMMARY OF INVENTION

Technical Problem

Hence, the invention is characterized in that, in an internal combustion engine control device in which a predetermined margin torque is set such that it is possible to maintain a predetermined engine idling speed by adjusting ignition timing, the margin torque is set to decrease, as a load of the internal combustion engine increases.

According to the invention, the margin torque can be set to an appropriate value, and thus it is possible to improve the fuel economy performance during idling operation of the internal combustion engine.

DESCRIPTION OF EMBODIMENTS

Figure 1:
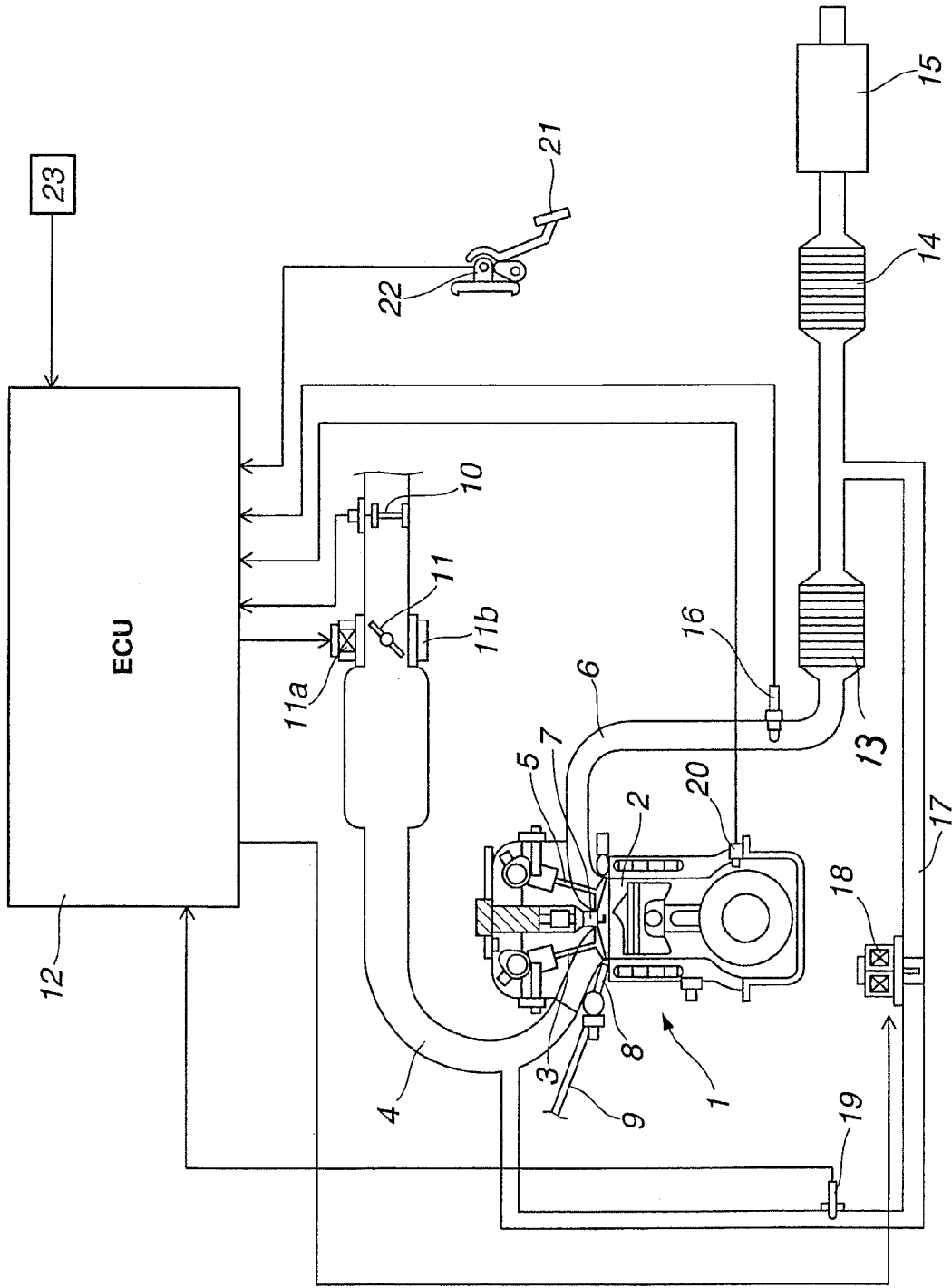
FIG. 1 is an explanatory view illustrating the schematic system configuration of an internal combustion engine to which the invention can be applied.

One embodiment of the invention is hereinafter described in reference to the drawings. FIG. 1 shows the schematic system configuration of an internal combustion engine 1 to which the invention can be applied.

In the internal combustion engine 1, which has been mounted on a vehicle, such as an automotive vehicle, an intake passage 4 is connected through an intake valve 3 to a combustion chamber 2 of internal combustion engine 1, whereas an exhaust passage 6 is connected through an exhaust valve 5 to the combustion chamber. A spark plug 7 is centrally located at the top of the combustion chamber 2. A fuel injection valve 8 is also located on the side face of combustion chamber 2 and arranged on the side of intake valve 3, for directly injecting fuel into the combustion chamber 2. Fuel, which has been adjusted or regulated to a predetermined pressure level by a high-pressure fuel pump (not shown) or the like, is supplied through a high-pressure fuel passage 9 into the fuel injection valve 8.

An airflow meter 10, which detects an intake air quantity, is located in the intake passage 4. A throttle valve 11 is located downstream of the airflow meter 10. Throttle valve 11 is equipped with an actuator 11a, which is comprised of an electric motor. The throttle opening of throttle valve 11 is controlled responsively to a control signal given or outputted from an engine control unit (ECU) 12. By the way, the valve opening of throttle 11 (i.e., the throttle opening) is detected by a throttle-valve opening sensor 11b built in the throttle valve 11. The throttle opening is controlled based on a signal detected by the throttle-valve opening sensor 11b, such that the valve opening of throttle valve 11 is brought closer to a target opening.

A catalytic converter 13, a second catalytic converter 14, and an exhaust silencer (a muffler) 15 are arranged in that order from the upstream side of exhaust passage 6. Also, an air-fuel (A/F) ratio sensor 16, which detects an air-fuel ratio, is located upstream of the catalytic converter 13.

An EGR (exhaust-gas-recirculation) passage 17, through which part of exhaust gas is recirculated or sent back to an intake system, is provided between the intake passage 4 and the exhaust passage 6. One end of EGR passage 17 is connected to the intake passage 4 at the downstream side of throttle valve 11, whereas the other end is connected to the exhaust passage 6 between the catalytic converter 13 and the second catalytic converter 14. The recirculation amount of exhaust gas, flowing through the EGR passage 17, is adjusted by an EGR control valve 18. A temperature of exhaust gas (EGR gas), flowing through the EGR passage 17, is detected by an EGR temperature sensor 19.

In addition to signals detected by airflow meter 10, air-fuel ratio sensor 16, and EGR temperature sensor 19, ECU 12 receives sensor signals detected by a variety of sensors, such as a crank angle sensor 20 that detects an engine revolution speed (engine speed) and a crank angle position, an accelerator opening sensor 22 that detects a depression amount (an accelerator opening) of a driver-operated accelerator pedal 21, a vehicle speed sensor 23 that detects vehicle speed, and the like.

ECU 12 controls, based on these input signals detected by various sensors, a fuel injection amount, fuel injection timing, throttle opening, valve opening of EGR control valve 18, and the like.

In the shown embodiment, an air-conditioner compressor, a radiator fan, an alternator serving as a generator for charging a vehicle-mounted battery, a power-steering oil pump and the like, are also driven by the internal combustion engine 1. That is, when these auxiliary machines, i.e., the air conditioner, the radiator fan, the alternator, the power-steering oil pump and the like, are driven responsively to a drive request for driving each auxiliary machine, auxiliary loads act on the internal combustion engine 1. Thus, a load of internal combustion engine 1 fluctuates (increases).

In the invention, to prevent rotation fluctuations from occurring owing to a delay in an output-torque increase produced by an increase in an intake air quantity with respect to load fluctuations caused by operating the auxiliary machines at idling operation during which the output torque of the internal combustion engine becomes small, a predetermined margin torque is set to prevent rotation fluctuations from occurring owing to load fluctuations by compensating or correcting such a delay in the output-torque increase produced by the increase in the intake air quantity by ignition-timing adjustment.

In more detail, when the internal combustion engine 1 is idling at a certain operating point, ignition timing is retarded from the minimum advance for the best torque (MBT) at this operating point by a predetermined ignition-timing correction amount. Additionally, by compensating a torque decrease caused by the retarded ignition timing by increasing the intake air quantity and by totally ensuring the output torque needed for the idling operation at the certain operating point, it is possible to set a torque, whose magnitude corresponds to the torque decrease caused by the retarded ignition timing, in other words, a margin torque that can be increased only by ignition-timing adjustment. That is to say, the margin torque is a torque that can be increased only by ignition-timing adjustment such that ignition timing is shifted to an ignition-timing change side (an ignition-timing retard side) on which the output (the efficiency) is decreased, while supplying an intake air quantity exceeding a given quantity corresponding to an actual output torque. In the internal combustion engine 1, which has been controlled as previously discussed during idling operation, this internal combustion engine is put into a state where it is possible to suppress the occurrence of rotation fluctuations by advancing the ignition timing under this condition and by increasing the output torque with a better response and consequently compensating a delay in the output-torque increase produced by an increase in the intake air quantity.

By the way, to prevent rotation fluctuations of engine revolution speed occurring owing to load fluctuations during idling operation, the margin torque has to cope with each and every load containing auxiliary loads which may possibly act on the internal combustion engine 1. Therefore, under an operating condition in which the load of the internal combustion engine during idling operation is low, for instance, under a specific condition in which all of the auxiliary machines are in their inactive states, it is necessary to cope with each and every auxiliary load, and necessarily the margin torque has to be set a high value. Conversely under an condition in which the load of the internal combustion engine during idling operation is high, for instance, under a specific condition in which all of the auxiliary machines are in their active states, it is not necessary to cope with a further auxiliary load. Hence, the margin torque can be set to such small value as to absorb hunting of idling speeds in a steady state.

Therefore, in the embodiment, the margin torque is set to decrease, as the load of internal combustion engine 1 during idling operation increases. This is because ignition timing tends to retard from the minimum advance for the best torque (MBT), as the margin torque becomes set higher. Hence, suppose that the margin torque has been set excessively higher than required. As a matter of course, owing to such excessive margin torque setting, the fuel economy performance tends to deteriorate.

Also, the output torque of internal combustion engine 1 tends to increase, as the charging efficiency becomes higher. Hence, the charging efficiency tends to become higher, as the load of internal combustion engine 1 becomes higher owing to the auxiliary machines and the like shifted to active during idling operation. For the reasons discussed above, in the first embodiment of the invention, a charging efficiency is used as a parameter indicating the magnitude of load acting on internal combustion engine 1, and also a margin torque is arithmetically calculated by the use of a margin-torque calculation map that the margin torque is calculated based on a charging efficiency. By the way, the charging efficiency is calculated based on a detected value of airflow meter 10 by means of ECU 12. Also, the above-mentioned margin-torque calculation map is predetermined or prepared in advance via experimental conformity evaluated by real machine tests, such that a margin torque is set to increase, as a charging efficiency decreases.

Figure 2:
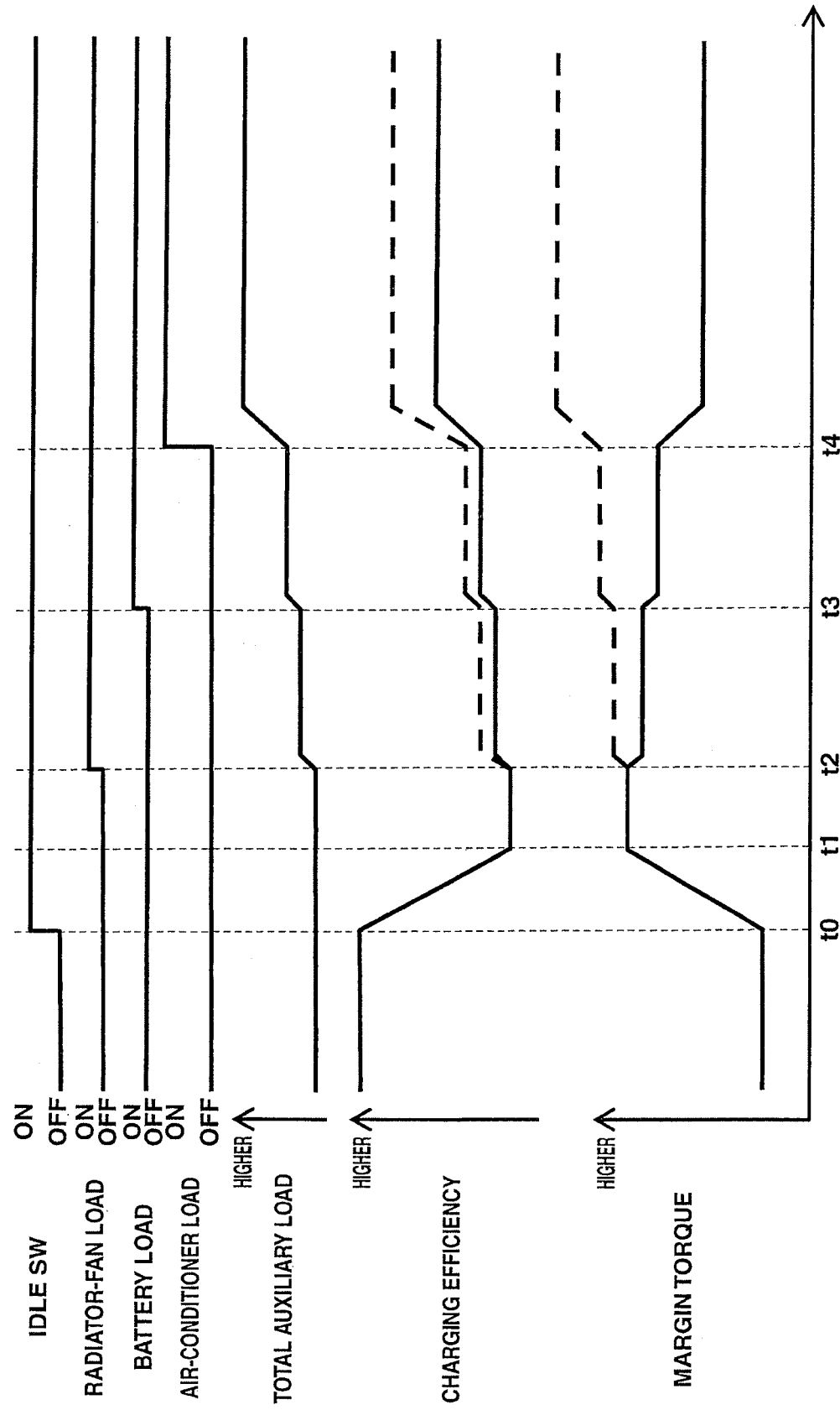
FIG. 2 is a timing chart illustrating a change in charging efficiency and a change in margin torque in the first embodiment of the invention.

FIG. 2 is the timing chart illustrating a change in charging efficiency and a change in margin torque in the first embodiment. By the way, in FIG. 2, the broken line indicates a comparative example in which a margin torque is set to increase, as the load acting on internal combustion engine 1 during idling operation increases.

At the time t0 when the operating condition becomes shifted to idling operation, a margin torque, whose magnitude is sufficient to cope with all loads which may possibly simultaneously act on the internal combustion engine 1 during the idling operation, is set.

The margin torque and the charging efficiency both change in a manner so as to be brought closer to their desired values at each individual predetermined rate of change from the time t0, taking account of the driveability, without changing in a stepwise manner at the time t0. The margin torque gradually increases from the time t0 when the operating condition becomes shifted to idling operation, and then reaches a desired value at the current operating point at the time t1. The charging efficiency gradually decreases from the time t0 when the operating condition becomes shifted to idling operation, and then reaches a desired value at the current operating point at the time t1. Hence, it is possible to reduce a torque step which may occur when the operating condition of internal combustion engine 1 has been switched to idling operation, thus enhancing the driveability.

Thereafter, a radiator-fan load, caused by the radiator fan driven from the time t2, acts on the internal combustion engine 1. A battery load, caused by the alternator driven from the time t3, acts on the internal combustion engine 1. Also, an air-conditioner load, caused by the air-conditioner compressor driven from the time t4, acts on the internal combustion engine 1.

As discussed previously, in the first embodiment, the margin torque is set to decrease, as the load of internal combustion engine 1 during idling operation increases. Thus, the margin torque tends to decrease in a stepwise manner at each of the times t2, t3, and t4.

In contrast, in the case of the comparative example, indicated by the broken line in FIG. 2, in which the margin torque is set to increase, as the load of internal combustion engine 1 during idling operation increases, the margin torque tends to increase in a stepwise manner at each of the times t2, t3, and t4. In this manner, in this comparative example, it is necessary to increase an intake air quantity by an increment in the margin torque, increased in conformity with the load increase. Thus, the charging efficiency tends to increase relatively.

In view of the above, in the first embodiment, the margin torque is set to decrease as the load of internal combustion engine 1 during idling operation increases, it is possible to relatively decrease the charging efficiency, when compared to the comparative example in which the margin torque is set to increase as the load of internal combustion engine 1 during idling operation increases. Hence, it is possible to relatively enhance the fuel economy performance during idling operation. In other words, in the first embodiment, the margin torque can be set to an appropriate value by setting the margin torque lower as the load of the internal combustion engine becomes higher. Hence, it is possible to enhance the fuel economy performance during idling operation of the internal combustion engine.

Also, a charging efficiency is used as a parameter indicating operating conditions of auxiliary machines, and thus it is possible to easily calculate auxiliary-machines operating conditions.

By the way, the intake air quantity increases as the engine revolution speed increases, and thus rotation fluctuations tend to reduce, because of more stable combustion. Accordingly, it is possible to bring the margin torque to a more appropriate value by setting the margin torque lower as the engine revolution speed increases.

Figure 3:
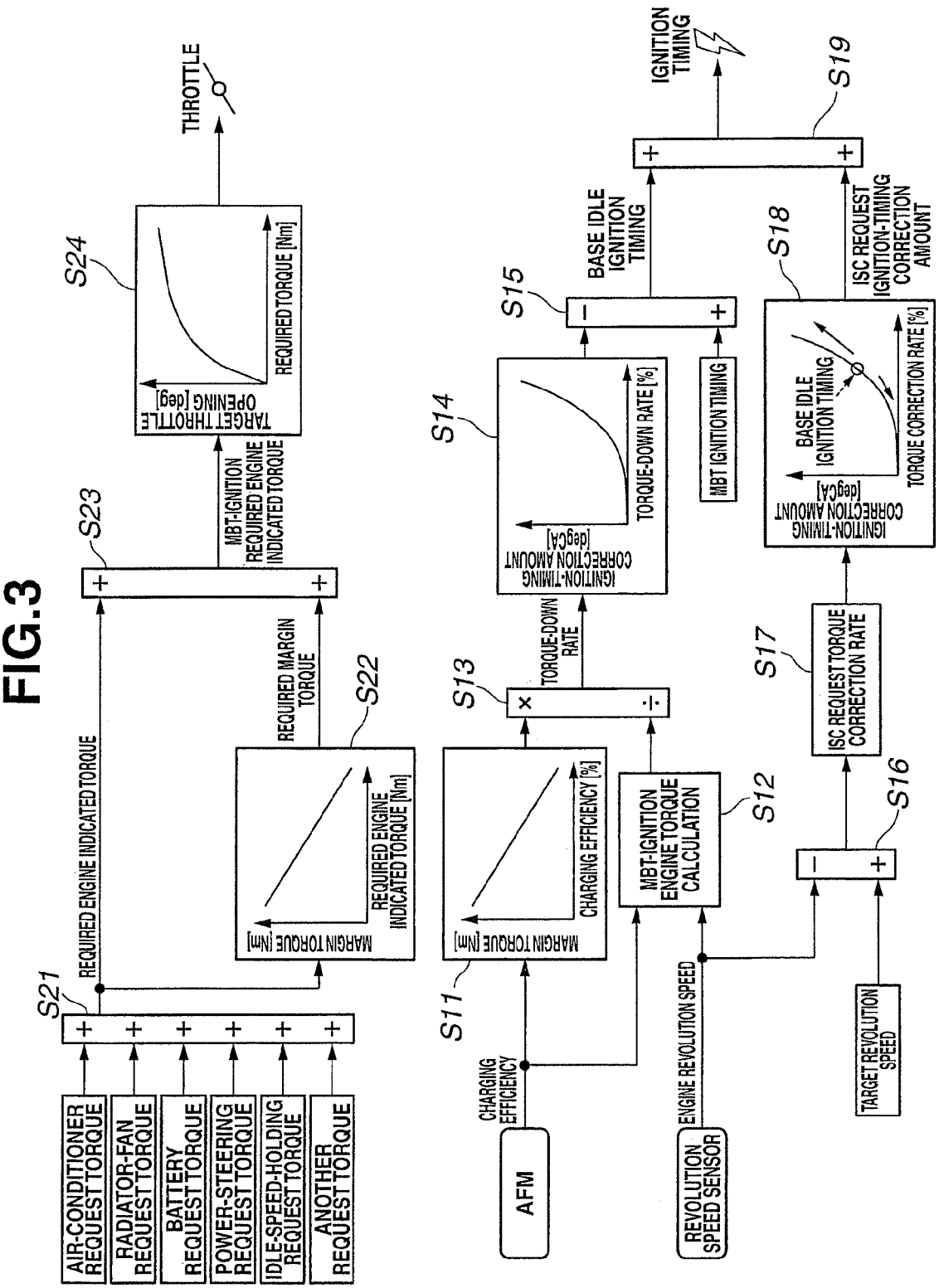
FIG. 3 is a block diagram illustrating procedures of arithmetic calculation for a target throttle opening and a target ignition timing during idling operation in the first embodiment of the invention.

FIG. 3 is the block diagram illustrating procedures of arithmetic calculation for a target throttle opening and a target ignition timing during idling operation in the first embodiment.

At step S11, a margin torque is calculated by the use of a first margin-torque calculation map, prepared in advance via experimental conformity, and a charging efficiency. The first margin-torque calculation map is set such that a margin torque increases, as a charging efficiency decreases.

At step S12, an output torque of internal combustion engine 1 (an MBT-ignition engine torque) when having been ignited at the minimum advance for the best torque (MBT) under the current operating condition, is calculated based on an MBT-ignition engine torque calculation map, prepared in advance via experimental conformity, a charging efficiency, and a current (latest up-to-date) engine revolution speed detected by the crank angle sensor 20.

At step S13, a torque-down rate is calculated by dividing the margin torque, calculated at step S11, by the MBT-ignition engine torque, calculated at step S12.

Thereafter, at step S14, an ignition-timing correction amount is calculated by the use of an ignition-timing correction amount calculation map, prepared in advance via experimental conformity, and the torque-down rate, calculated at step S13. That is, this step S14 corresponds to an ignition-timing correction amount calculation means.

Alternatively, such an ignition-timing correction amount may be calculated directly from the margin torque. However, it is possible to calculate the ignition-timing correction amount well, by simple map setting, from the torque-down rate calculated based on the margin torque.

That is, it is possible to calculate the ignition-timing correction amount from the ignition-timing correction calculation map that is a single map data in which there is a one-to-one correspondence between an ignition-timing correction amount and a torque-down rate. Hence, it is possible to reduce the number of map data, as compared to a way to calculate an ignition-timing correction amount from a large number of map data, thereby simplifying a control program used to calculate an ignition-timing correction amount.

Also, it is possible to utilize the minimum advance for the best torque (MBT), which is used in all operating scenes, as a reference. Hence, assume that a variety of corrections, such as coolant temperature correction, intake-air temperature, correction, intake valve timing correction, and exhaust valve timing correction and the like, are added to the MBT in advance. In such a case, it is unnecessary to add these corrections to an ignition-timing correction amount during idling operation. Thus, it is possible to prevent an increase in the number of map data.

At step S15, a base idle ignition timing is calculated by subtracting the ignition-timing correction amount, calculated at step S14, from the minimum advance for the best torque (MBT) for the current operating condition.

At step S16, a revolution-speed difference is calculated by subtracting the current engine revolution speed detected by the crank angle sensor 20 from a current target engine revolution speed. At step S17, a torque correction rate, at which the engine revolution speed is brought closer to the current target engine revolution speed, is calculated based on the revolution-speed difference, calculated at step S16. At step S18, an ISC request ignition-timing correction amount, which is based on an idle-speed-control (ISC) request needed to bring the engine revolution speed of internal combustion engine 1 closer to the target revolution speed, is calculated by the use of an ISC request ignition-timing correction amount calculation map, prepared in advance via experimental conformity, and the torque correction rate, calculated at step S17. That is, a series of steps S16-S18 are configured to calculate an amount of feedback correction (feedback compensation) of ignition timing when executing feedback control such that the engine revolution speed of internal combustion engine 1 is brought closer to the target revolution speed.

Then, at step S19, a final ignition timing is calculated by adding the ISC request ignition-timing correction amount, calculated at step S18, to the base idle ignition timing, calculated at step S15.

At step S21, a required engine indicated torque, which is required for the internal combustion engine 1 during idling operation, is calculated. The required engine indicated torque is calculated by adding an auxiliary-machine drive-request torque needed to drive the auxiliary machines with their drive requests to an idle-speed-holding request torque needed to maintain or hold a predetermined engine idling speed, and further adding another request torque for devices (for example, a wiper device that comes into operation, a power window that comes into operation, and the like) that require an increase in the load of internal combustion engine 1 due to factors other than the above to the idle-speed-holding request torque. In other words, the required engine indicated torque can be comprehended or regarded as a desired value of the charging efficiency. For instance, as various auxiliary-machine drive-request torques, there are an air-conditioner request torque corresponding to the previously-discussed air-conditioner load, a radiator-fan request torque corresponding to the radiator-fan load, a battery request torque corresponding to the battery (alternator) load, and a power-steering request torque corresponding to the power-steering oil pump drive request.

At step S22, a required margin torque is calculated by the use of a second margin-torque calculation map, prepared in advance via experimental conformity, and the required engine indicated torque, calculated at step S21. The second margin-torque calculation map is set such that a margin torque increases, as a required engine indicated torque decreases.

At step S23, an MET-ignition required engine indicated torque (a required torque) is calculated by adding the required margin torque, calculated at step S22, to the required engine indicated torque, calculated at step S21.

At step S24, a target throttle opening is calculated by the use of a throttle opening calculation map, prepared in advance via experimental conformity, and the MET-ignition required engine indicated torque (the required torque), calculated at step S23. The throttle opening calculation map is set such that a target throttle opening increases, as an MET-ignition required engine indicated torque (a required torque) increases.

By the way, regarding the margin torque (i.e., the second margin-torque calculation map of step S22) used for calculating the throttle opening (an increasing amount of throttle opening) and the margin torque (i.e., the first margin-torque calculation map of step S11) used for calculating the ignition timing (a retard amount of ignition timing), the former is based on the required engine indicated torque (a desired value of the charging efficiency) corresponding to a required torque value (a target torque value) in which auxiliary-machine driving torques and the like are included. On the other hand, the latter is based on an actual charging efficiency calculated based on a detected value of airflow meter 10. Hence, when a delay of an actual charging efficiency change with respect to a throttle-opening change has occurred, a change in ignition timing can be well adapted to a change in charging efficiency. Thus, it is possible to prevent a torque step from occurring owing to a rapid change in ignition timing. However, as a matter of course, conversely in the case of a less delay of a throttle-opening change (that is, when a throttle-opening change is slow), the required engine indicated torque (a desired value of the charging efficiency) corresponding to a required torque value may be utilized as a margin torque used for calculating the ignition timing. As discussed above, either the former margin-torque calculation map or the latter margin-torque calculation map may be selectively used, for instance, depending on a rate of change in throttle opening.

Figure 4:
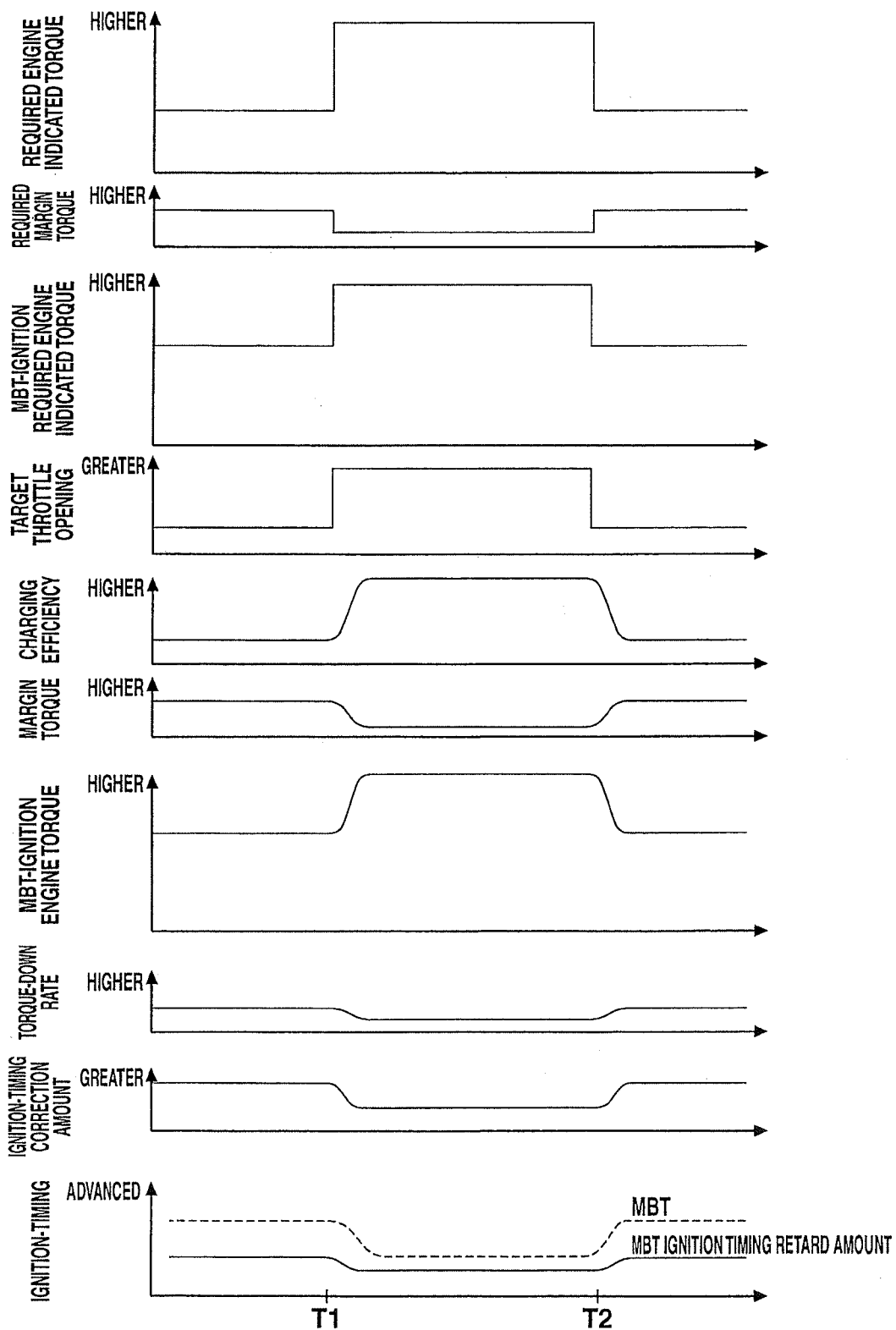
FIG. 4 is a timing chart illustrating changes in various parameters during idling operation in the first embodiment of the invention.

FIG. 4 is the timing chart illustrating one example of changes in various parameters during idling operation in the first embodiment.

When one of the auxiliary machines comes into operation during the time period from the time T1 to the time T2, the required engine indicated torque, calculated at step S21, increases during the time period T1-T2. At this time, the required margin torque, calculated at step S22, decreases by an increment of the load acting on the internal combustion engine 1, occurring owing to such an input of the auxiliary load. Also, the MBT-ignition required engine indicated torque, calculated at step S23, increases owing to an increase in the intake air quantity during the time period T1-T2. The target throttle opening, calculated at step S24, increases for increasing the intake air quantity during the time period T1-T2.

Also, during the time period T1-T2, the charging efficiency increases, because of an increase in the load acting on the internal combustion engine 1. Thus, the margin torque, calculated at step S11, tends to decrease during the time period T1-T2 during which the auxiliary machine is operating.

During the time period T1-T2, the MBT-ignition engine torque, calculated at step S12, increases, whereas the torque-down rate, calculated at step S13, decreases. Also, during the time period T1-T2, the ignition-timing correction amount (a retard amount), calculated at step S14, decreases.

The ignition timing, calculated at step S19, retards during the time period T1-T2. In the case of the shown embodiment, an increase in the intake air quantity can be suppressed by decreasing the margin torque during the time period T1-T2 during which the load of internal combustion engine 1 is increasing. Hence, the retard amount of ignition timing with respect to the minimum advance for the best torque (MBT), indicated by the broken line in FIG. 4, tends to become relatively small.

The other embodiments of the invention are hereunder explained. In explaining the other embodiments, the same reference signs used to designate elements in the first embodiment will be applied to the corresponding elements used in the other embodiments, while detailed description of the same reference signs will be omitted because the above description thereon seems to be self-explanatory.

In a similar manner to the first embodiment, in the second embodiment, the margin torque is set to decrease, as the load of internal combustion engine 1 increases. However, in the second embodiment, the margin torque is calculated as a value obtained by subtracting the load, which has already acted on the internal combustion engine 1, from a summed value of all loads which may possibly act on the internal combustion engine 1 during idling operation.

For that reason, in the second embodiment, it is possible to more accurately set a necessary margin torque by exactly grasping a summed value of loads which may possibly act on the internal combustion engine 1 during idling operation. Hence, in the second embodiment, in the same manner as the first embodiment, it is possible to enhance the fuel economy performance during idling operation of the internal combustion engine.

Figure 5:
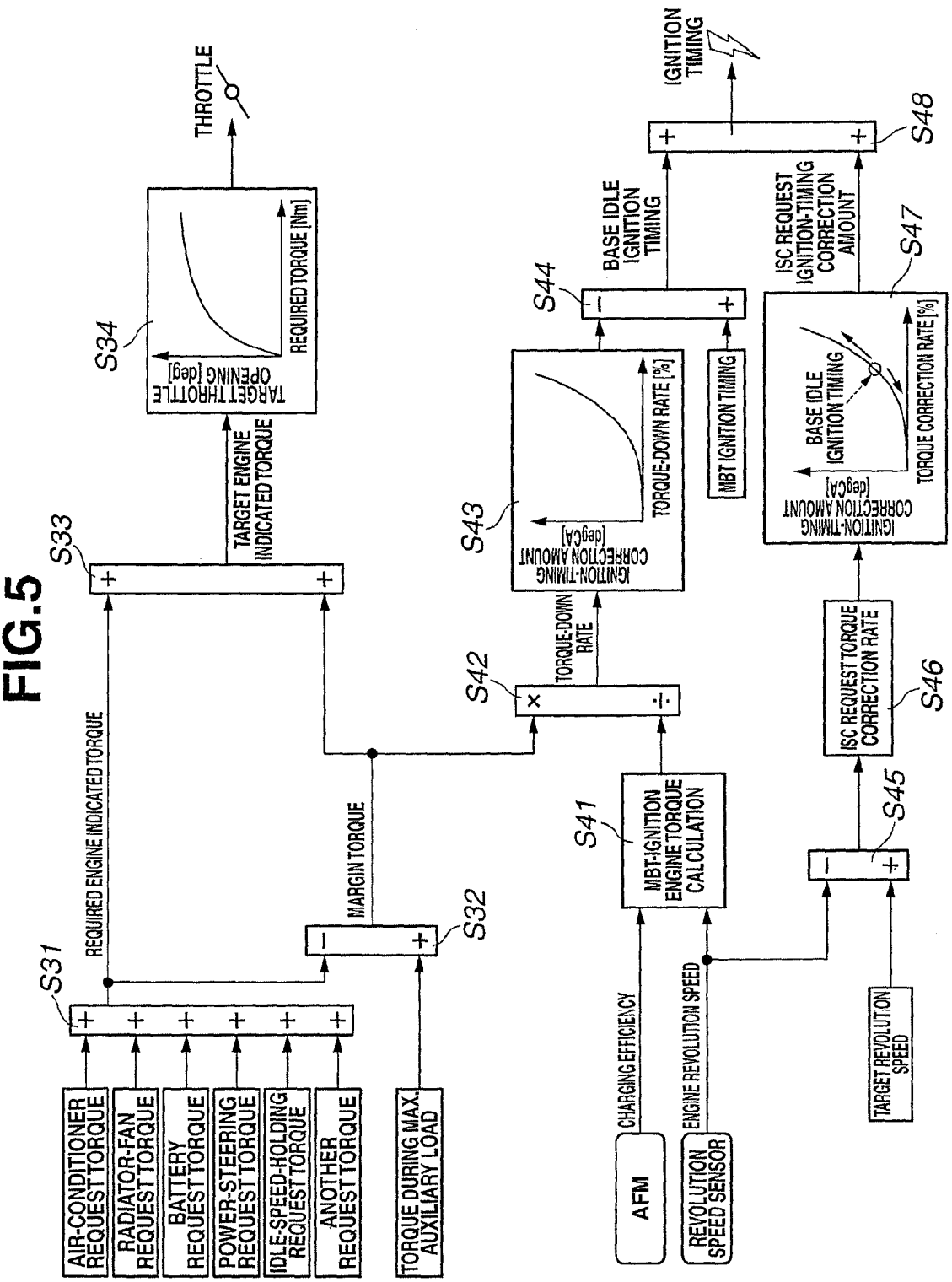
FIG. 5 is a block diagram illustrating procedures of arithmetic calculation for a target throttle opening and a target ignition timing during idle operation in the second embodiment of the invention.

FIG. 5 is the block diagram illustrating procedures of arithmetic calculation for a target throttle opening and a target ignition timing during idling operation in the second embodiment.

At step S31, a required engine indicated torque, which is required for the internal combustion engine 1 during idling operation, is calculated. The required engine indicated torque is calculated by adding the auxiliary-machine drive-request torque to the idle-speed-holding request torque, and further adding another request torque to the idle-speed-holding request torque.

At step S32, the margin torque is calculated as a value obtained by subtracting the load, which has already acted on the internal combustion engine 1, from a summed value of all auxiliary loads which may possibly act on the internal combustion engine 1 during idling operation.

At step S33, a target engine indicated torque (a required torque) is calculated by adding the margin torque, calculated at step S32, to the required engine indicated torque, calculated at step S31.

At step S34, a target throttle opening is calculated by the use of a throttle opening calculation map, prepared in advance via experimental conformity, and the target engine indicated torque (the required torque), calculated at step S33. The throttle opening calculation map is set such that a target throttle opening increases, as a target engine indicated torque (a required torque) increases.

At step S41, an output torque of internal combustion engine 1 (an MBT-ignition engine torque) when having been ignited at the minimum advance for the best torque (MBT) under the current operating condition, is calculated based on an MBT-ignition engine torque calculation map, prepared in advance via experimental conformity, a charging efficiency, and a current (latest up-to-date) engine revolution speed detected by the crank angle sensor 20.

At step S42, a torque-down rate is calculated by dividing the margin torque, calculated at step S32, by the MBT-ignition engine torque, calculated at step S41.

Thereafter, at step S43, an ignition-timing correction amount is calculated by the use of an ignition-timing correction amount calculation map, prepared in advance via experimental conformity, and the torque-down rate, calculated at step S42.

At step S44, a base idle ignition timing is calculated by subtracting the ignition-timing correction amount, calculated at step S43, from the minimum advance for the best torque (MBT) for the current operating condition.

At step S45, a revolution-speed difference is calculated by subtracting the current engine revolution speed detected by the crank angle sensor 20 from a current target engine revolution speed. At step S46, a torque correction rate, at which the engine revolution speed is brought closer to the current target engine revolution speed, is calculated based on the revolution-speed difference, calculated at step S45. At step S47, an ISC request ignition-timing correction amount, which is based on an idle-speed-control (ISC) request needed to bring the engine revolution speed of internal combustion engine 1 closer to the target revolution speed, is calculated by the use of an ISC request ignition-timing correction amount calculation map, prepared in advance via experimental conformity, and the torque correction rate, calculated at step S46. Then, at step S48, a final ignition timing is calculated by adding the ISC request ignition-timing correction amount, calculated at step S47, to the base idle ignition timing, calculated at step S44.

The third embodiment of the invention is hereunder explained. In a similar manner to the first embodiment, in the third embodiment, the margin torque is set to decrease, as the load of internal combustion engine 1 increases. However, in the third embodiment, the margin torque is calculated only from a required engine indicated torque, which is required for the internal combustion engine 1 during idling operation.

That is, in the third embodiment, it is possible to calculate a margin torque by using a required engine indicated torque corresponding to a target torque value as a parameter indicating the magnitude of load, possibly acting on the internal combustion engine during idling operation, prior to feedback control for engine revolution speed, executed such that the engine revolution speed of internal combustion engine 1 is brought closer to a predetermined engine idling speed. Hence, it is possible to suppress an undesirable drop or a flare-up of engine revolution speed. Also, in the third embodiment, the margin torque is set to decrease, as the load of internal combustion engine 1 increases. Hence, in the third embodiment, in the same manner as the first embodiment, it is possible to enhance the fuel economy performance during idling operation of the internal combustion engine.

Figure 6:
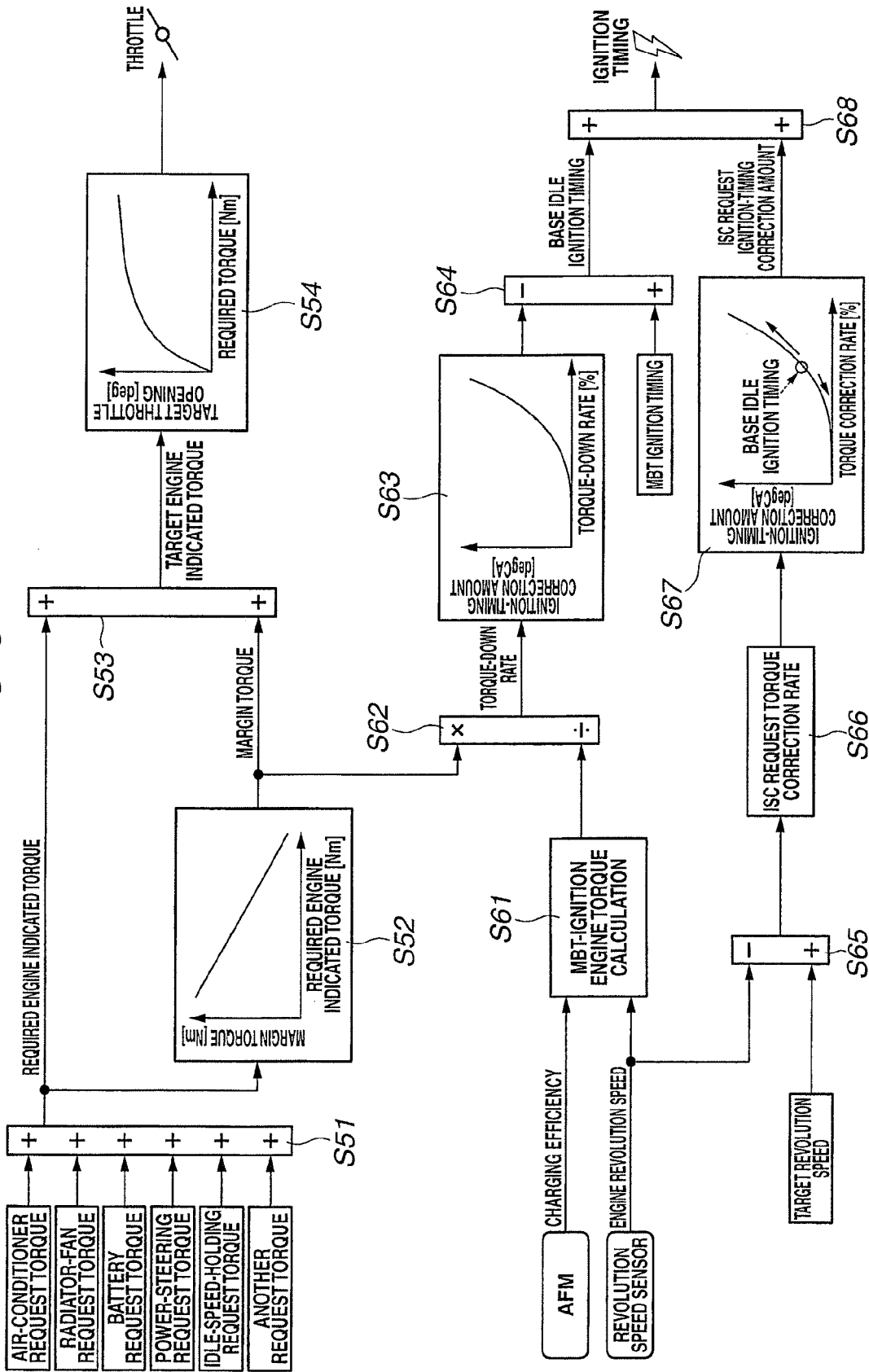
FIG. 6 is a block diagram illustrating procedures of arithmetic calculation for a target throttle opening and a target ignition timing during idling operation in the third embodiment of the invention.

FIG. 6 is the block diagram illustrating procedures of arithmetic calculation for a target throttle opening and a target ignition timing during idling operation in the third embodiment.

At step S51, a required engine indicated torque, which is required for the internal combustion engine 1 during idling operation, is calculated. The required engine indicated torque is calculated by adding the auxiliary-machine drive-request torque to the idle-speed-holding request torque, and further adding another request torque to the idle-speed-holding request torque.

At step S52, a margin torque is calculated by the use of a margin-torque calculation map, prepared in advance via experimental conformity, and the required engine indicated torque, calculated at step S51. The margin-torque calculation map is set such that a margin torque increases, as a required engine indicated torque decreases.

At step S53, a target engine indicated torque (a required torque) is calculated by adding the margin torque, calculated at step S52, to the required engine indicated torque, calculated at step S51.

At step S54, a target throttle opening is calculated by the use of a throttle opening calculation map, prepared in advance via experimental conformity, and the target engine indicated torque (the required torque), calculated at step S53. The throttle opening calculation map is set such that a target throttle opening increases, as a target engine indicated torque (a required torque) increases.

At step S61, an output torque of internal combustion engine 1 (an MBT-ignition engine torque) when having been ignited at the minimum advance for the best torque (MBT) under the current operating condition, is calculated based on an MBT-ignition engine torque calculation map, prepared in advance via experimental conformity, a charging efficiency, and a current (latest up-to-date) engine revolution speed detected by the crank angle sensor 20.

At step S62, a torque-down rate is calculated by dividing the margin torque, calculated at step S52, by the MBT-ignition engine torque, calculated at step S61.

Thereafter, at step S63, an ignition-timing correction amount is calculated by the use of an ignition-timing correction amount calculation map, prepared in advance via experimental conformity, and the torque-down rate, calculated at step S62.

At step S64, a base idle ignition timing is calculated by subtracting the ignition-timing correction amount, calculated at step S63, from the minimum advance for the best torque (MBT) for the current operating condition.

At step S65, a revolution-speed difference is calculated by subtracting the current engine revolution speed detected by the crank angle sensor 20 from a current target engine revolution speed. At step S66, a torque correction rate, at which the engine revolution speed is brought closer to the current target engine revolution speed, is calculated based on the revolution-speed difference, calculated at step S65. At step S67, an ISC request ignition-timing correction amount, which is based on an idle-speed-control (ISC) request needed to bring the engine revolution speed of internal combustion engine 1 closer to the target revolution speed, is calculated by the use of an ISC request ignition-timing correction amount calculation map, prepared in advance via experimental conformity, and the torque correction rate, calculated at step S66. Then, at step S68, a final ignition timing is calculated by adding the ISC request ignition-timing correction amount, calculated at step S67, to the base idle ignition timing, calculated at step S64.

The invention claimed is:

1. An internal combustion engine control device, in which a margin torque that can be increased by ignition-timing adjustment such that ignition timing is shifted to an ignition-timing change side on which an engine output is decreased, while supplying an intake air quantity exceeding a given quantity corresponding to an actual engine output torque with respect to load fluctuations during idling operation is set, comprising:
an engine control unit comprising a target torque calculation means for calculating a target torque of an internal combustion engine, the engine control unit configured to
set the target torque such that the target torque increases, as an auxiliary load, acting on the internal combustion engine, increases,
set the margin torque such that the margin torque decreases, as a load of the internal combustion engine during idling operation increases, and
calculate the margin torque as a value obtained by subtracting the auxiliary load, which has already acted on the internal combustion engine, from a summed value of all loads which may possibly act on the internal combustion engine during idling operation.

2. An internal combustion engine control device as recited in claim 1, wherein:
the margin torque is set by retarding the ignition timing from a minimum advance for a best torque and by increasing the intake air quantity more than a base intake air quantity corresponding to the minimum advance for the best torque.

3. An internal combustion engine control device as recited in claim 1, wherein:
the margin torque is set to decrease, as an engine revolution speed of the internal combustion engine during idling operation increases.

4. An internal combustion engine control device as recited in claim 1, the engine control unit further comprising:
a charging efficiency calculation means for calculating a charging efficiency of the internal combustion engine,
wherein the margin torque is set to increase, as the charging efficiency decreases.

5. An internal combustion engine control device as recited in claim 1, wherein:
the margin torque is set to increase, as the target torque decreases.

6. An internal combustion engine control device as recited in claim 1, wherein:
the margin torque is set to change to a desired value at a predetermined rate of increase when an operating condition of the internal combustion engine has been switched to idling operation.

7. An internal combustion engine control device, in which a margin torque that can be increased by ignition-timing adjustment such that ignition timing is shifted to an ignition-timing change side on which an engine output is decreased, while supplying an intake air quantity exceeding a given quantity corresponding to an actual engine output torque with respect to load fluctuations during idling operation is set, comprising:
an engine control unit comprising a target torque arithmetic-calculation part configured to calculate a target torque of an internal combustion engine, the engine control unit configured to
set the target torque such that the target torque increases, as an auxiliary load, acting on the internal combustion engine, increases,
set the margin torque such that the target torque decreases, as a load of the internal combustion engine during idling operation increases, and
calculate the margin torque as a value obtained by subtracting the auxiliary load, which has already acted on the internal combustion engine, from a summed value of all loads which may possibly act on the internal combustion engine during idling operation.

8. An internal combustion engine control device as recited in claim 7, wherein:
the margin torque is set by retarding the ignition timing from a minimum advance for a best torque and by increasing the intake air quantity more than a base intake air quantity corresponding to the minimum advance for the best torque.

9. An internal combustion engine control device as recited in claim 7, wherein:
the margin torque is set to decrease, as an engine revolution speed of the internal combustion engine during idling operation increases.

10. An internal combustion engine control device as recited in claim 7, the engine control unit further comprising:
a charging efficiency arithmetic-calculation part configured to calculate a charging efficiency of the internal combustion engine, wherein the margin torque is set to increase, as the charging efficiency decreases.

11. An internal combustion engine control device as recited in claim 7, wherein:
the margin torque is set to increase, as the target torque decreases.

12. An internal combustion engine control device as recited in claim 7, wherein:
the margin torque is set to change to a desired value at a predetermined rate of increase when an operating condition of the internal combustion engine has been switched to idling operation.

13. An internal combustion engine control device, in which a margin torque that can be increased by ignition-timing adjustment such that ignition timing is shifted to an ignition-timing change side on which an engine output is decreased, while supplying an intake air quantity exceeding a given quantity corresponding to an actual engine output torque with respect to load fluctuations during idling operation is set, comprising:
an engine control unit including a target torque calculation means for calculating a target torque of an internal combustion engine, the engine control unit configured to
set the target torque such that the target torque increases, as an auxiliary load, acting on the internal combustion engine, increases, and
set the margin torque such that the margin torque decreases, as a load of the internal combustion engine during idling operation increases; and
the engine control unit further comprising
a torque-down rate calculation means for calculating a torque-down rate by dividing the margin torque by an output torque of the internal combustion engine obtained when the ignition timing has been set at a minimum advance for a best torque under a current operating condition; and
an ignition-timing correction amount calculation means for calculating an ignition-timing correction amount of the internal combustion engine during idling operation, using the torque-down rate.

14. An internal combustion engine control device as recited in claim 13, wherein:
the margin torque is set by retarding the ignition timing from a minimum advance for a best torque and by increasing the intake air quantity more than a base intake air quantity corresponding to the minimum advance for the best torque.

15. An internal combustion engine control device as recited in claim 13, wherein:
the margin torque is set to decrease, as an engine revolution speed of the internal combustion engine during idling operation increases.

16. An internal combustion engine control device as recited in claim 13, the engine control unit further comprising:
a charging efficiency calculation means for calculating a charging efficiency of the internal combustion engine,
wherein the margin torque is set to increase, as the charging efficiency decreases.

17. An internal combustion engine control device as recited in claim 13, wherein:
the margin torque is calculated as a value obtained by subtracting the auxiliary load, which has already acted on the internal combustion engine, from a summed value of all loads which may possibly act on the internal combustion engine during idling operation.

18. An internal combustion engine control device as recited in claim 13, wherein:
the margin torque is set to increase, as the target torque decreases.

19. An internal combustion engine control device as recited in claim 13, wherein:
the margin torque is set to change to a desired value at a predetermined rate of increase when an operating condition of the internal combustion engine has been switched to idling operation.

20. An internal combustion engine control device, in which a margin torque that can be increased by ignition-timing adjustment such that ignition timing is shifted to an ignition-timing change side on which an engine output is decreased, while supplying an intake air quantity exceeding a given quantity corresponding to an actual engine output torque with respect to load fluctuations during idling operation is set, comprising:
an engine control unit including a target torque arithmetic-calculation part configured to calculate a target torque of an internal combustion engine, the engine control unit configured to
set the target torque such that the target torque increases, as an auxiliary load, acting on the internal combustion engine, increases, and
set the margin torque such that the margin torque decreases, as a load of the internal combustion engine during idling operation increases; and
the engine control unit further comprising
a torque-down rate arithmetic-calculation part configured to calculate a torque-down rate by dividing the margin torque by an output torque of the internal combustion engine obtained when the ignition timing has been set at a minimum advance for a best torque under a current operating condition; and
an ignition-timing correction amount arithmetic-calculation part configured to calculate an ignition-timing correction amount of the internal combustion engine during idling operation, using the torque-down rate.

21. An internal combustion engine control device as recited in claim 20, wherein:
the margin torque is set by retarding the ignition timing from a minimum advance for a best torque and by increasing the intake air quantity more than a base intake air quantity corresponding to the minimum advance for the best torque.

22. An internal combustion engine control device as recited in claim 20, wherein:
the margin torque is set to decrease, as an engine revolution speed of the internal combustion engine during idling operation increases.

23. An internal combustion engine control device as recited in claim 20, the engine control unit further comprising:
a charging efficiency calculation means for calculating a charging efficiency of the internal combustion engine,
wherein the margin torque is set to increase, as the charging efficiency decreases.

24. An internal combustion engine control device as recited in claim 20, wherein:
the margin torque is calculated as a value obtained by subtracting the auxiliary load, which has already acted on the internal combustion engine, from a summed value of all loads which may possibly act on the internal combustion engine during idling operation.

25. An internal combustion engine control device as recited in claim 20, wherein:
the margin torque is set to increase, as the target torque decreases.

26. An internal combustion engine control device as recited in claim 20, wherein:
 the margin torque is set to change to a desired value at a predetermined rate of increase when an operating condition of the internal combustion engine has been switched to idling operation.

* * * * *